United States Patent [19]

Murcko

[11] Patent Number: 4,551,967

[45] Date of Patent: Nov. 12, 1985

[54] COMBINATION LAWNMOWER AND EDGER

[76] Inventor: Joseph S. Murcko, 744 Annsway, Vista, Calif. 92083

[21] Appl. No.: 708,062

[22] Filed: Mar. 4, 1985

[51] Int. Cl.[4] ............................................. A01D 53/14
[52] U.S. Cl. ...................................... 56/13.7; 56/11.3; 56/11.6; 56/17.1; 56/256
[58] Field of Search ...................... 56/10.8, 11.3, 11.6, 56/11.7, 11.8, 13.7, 16.9, 17.1, 256

[56] References Cited

U.S. PATENT DOCUMENTS

| | | | |
|---|---|---|---|
| 3,183,652 | 5/1965 | Pratt | 56/13.7 |
| 3,236,037 | 2/1966 | Porterfield | 56/16.9 |
| 3,319,406 | 5/1967 | Miles | 56/13.7 |
| 3,421,300 | 1/1969 | Rhodes | 56/16.9 |
| 3,531,922 | 10/1970 | Hansen | 56/13.7 |
| 3,668,845 | 6/1972 | Parker | 56/11.6 |
| 3,686,839 | 8/1972 | Lambert | 56/11.6 |
| 3,693,334 | 9/1972 | Lowery | 56/16.9 |
| 3,710,563 | 1/1973 | Polette et al. | 56/11.8 |
| 3,782,085 | 1/1974 | Parker et al. | 56/11.6 |
| 3,871,160 | 3/1975 | Hopper | 56/13.7 |
| 4,170,099 | 10/1979 | Owens | 56/16.9 |

Primary Examiner—Gene Mancene
Assistant Examiner—David I. Tarnoff
Attorney, Agent, or Firm—Duane C. Bowen

[57] ABSTRACT

A combination rotary mower and edger having a control lever on the handle, a flexible cable connected to the lever, and edger operating parts connected to the cable including a pivotal arm for raising and lowering the edger blade, an idler pulley for belt tightening to provide power to the edger blade, and a belt brake that is released to permit powering of the edger blade.

14 Claims, 11 Drawing Figures

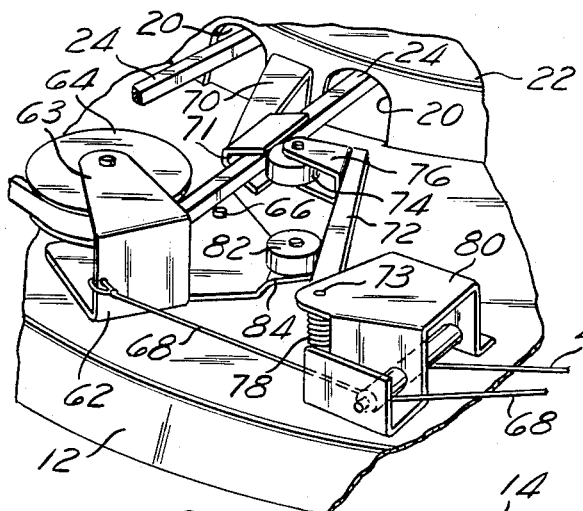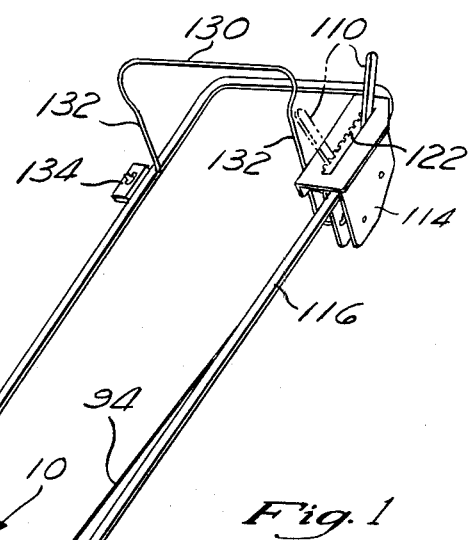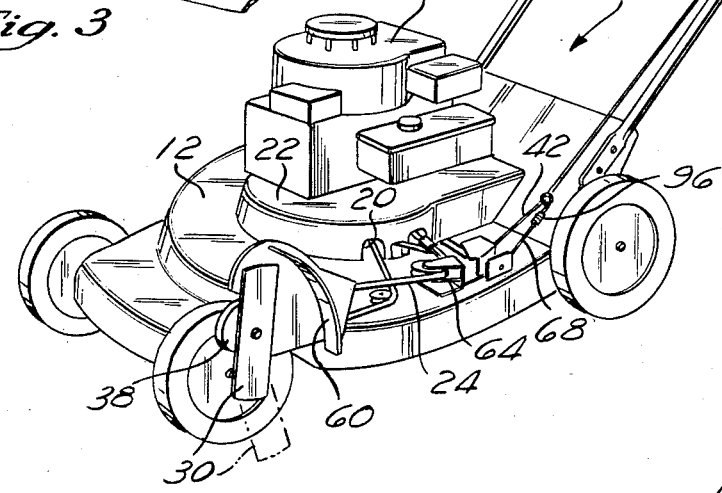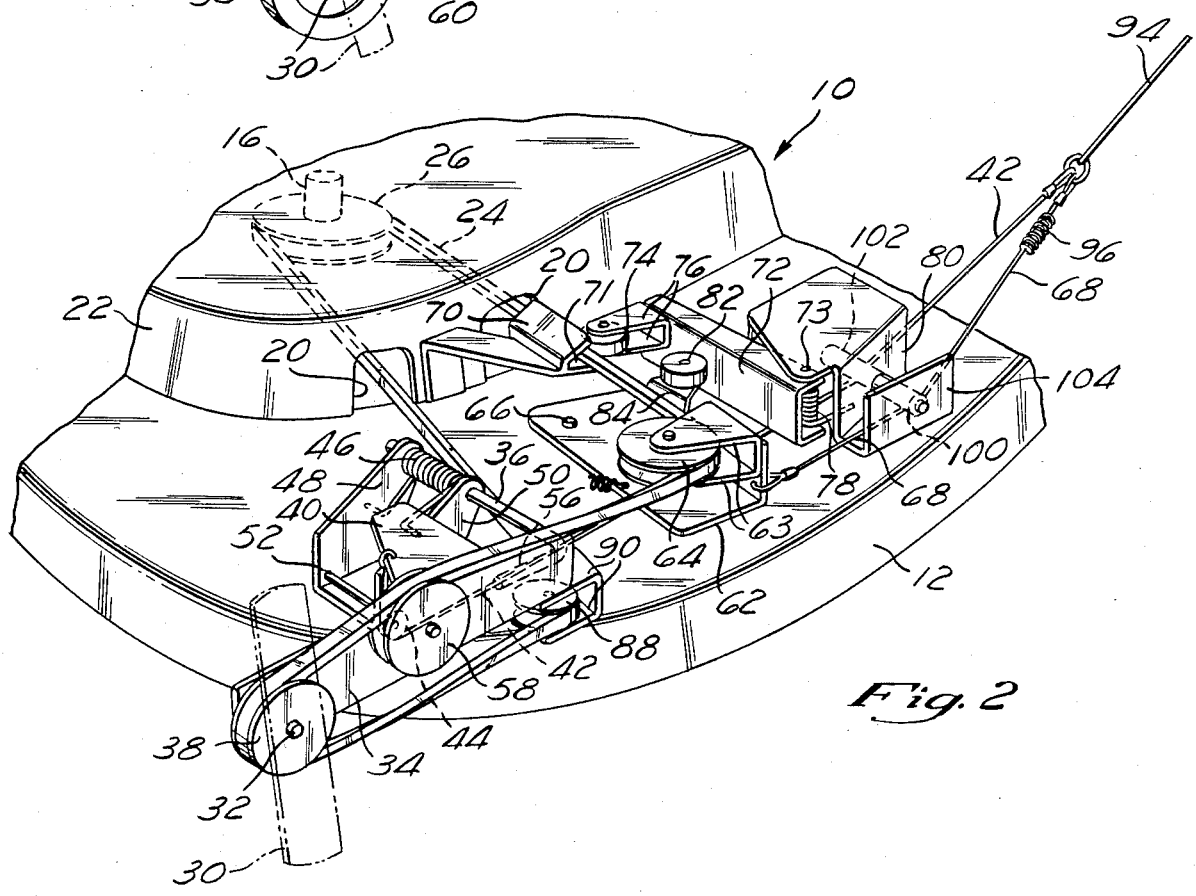

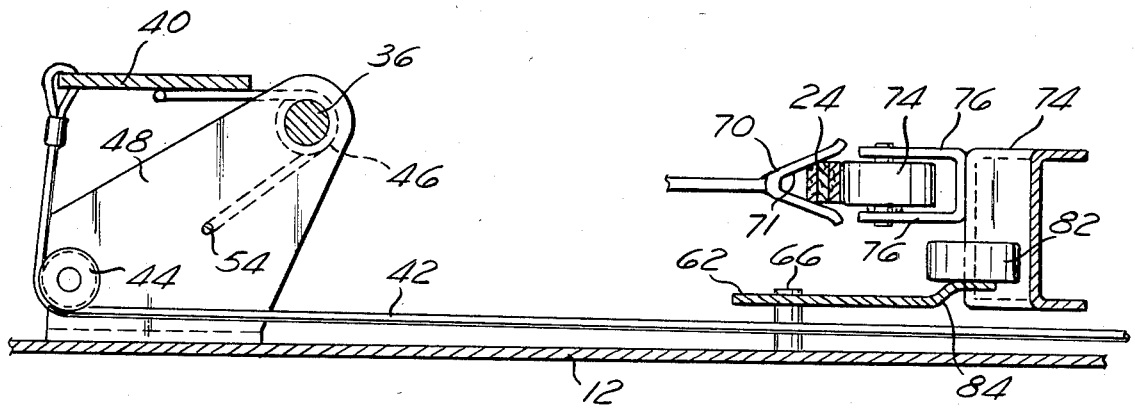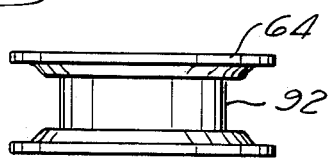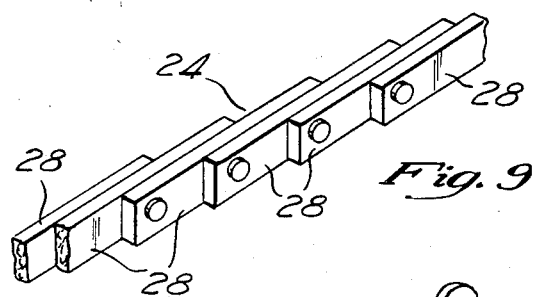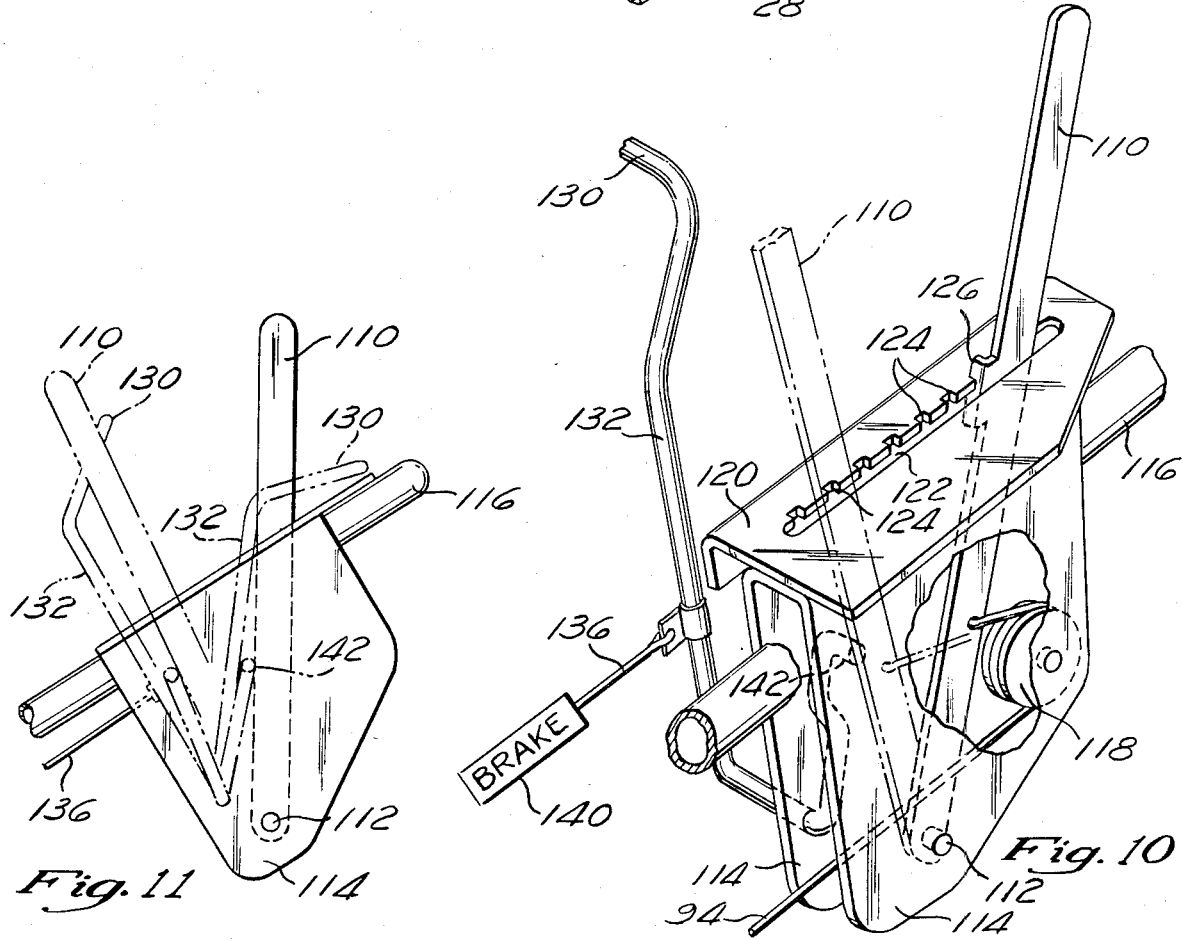

COMBINATION LAWNMOWER AND EDGER

BRIEF SUMMARY OF THE INVENTION

Background and Objectives

My invention relates to a lawnmower and edger produced as one article in original manufacture.

A number of combined lawnmowers and edgers have been proposed in which the edgers were an add-on to commercially available mowers. The practicability of add-on units may be questioned but, in any case, it is an objective of my invention to provide a machine combining lawn mowing and edging functions in original manufacture design.

A fundamental consideration in design of lawnmowers, edgers or combined unit is safety. It is an objective of my invention to provide for safety, i.e., to condition lowering and powering of the edger to holding an operating device in position on the machine guiding handle or, in the case of a machine with a deadman bar on the guiding handle which brakes the grass-cutting rotor when released, only permitting operation of the edger when the deadman bar is released. It is an additional objective, in the nature of a safety feature, to provide that the edger blade can only be powered when both a belt-tightener is tightened and a belt brake is released by means of operation of a control device on the guiding handle.

Further objectives include: to design a combined mower-edger which is of economical construction but is sturdy and practical and will be easily operated and will require little maintenance; and to design a combined mower-edger in which the grass-cutting blade intersects the plane of the edger blade so as to provide a neat trimmed grass edge in operation.

My invention will be best understood, together with additional advantages and objectives thereof, when read with reference to the drawings.

THE DRAWINGS

FIG. 1 is a perspective view of a specific embodiment of my new lawnmower and edger.

FIG. 2 is an enlarged, partial perspective view with portions broken away to better reveal certain mechanisms.

FIG. 3 is an enlarged, partial perspective view at a different angle.

FIG. 7 is an enlarged side view partly in section taken as indicated on line 7—7 in FIG. 4.

FIG. 8 is a side view showing the contour of the idler pulley.

FIG. 9 is a perspective view of the belt used in the apparatus.

FIG. 10 is an enlarged fragmentary perspective of details of the edger control assembly on the handle of the apparatus.

FIG. 11 is a side view of the structure shown in FIG. 10 showing operative and inoperative control positions.

SPECIFIC DESCRIPTION

Figure 4:
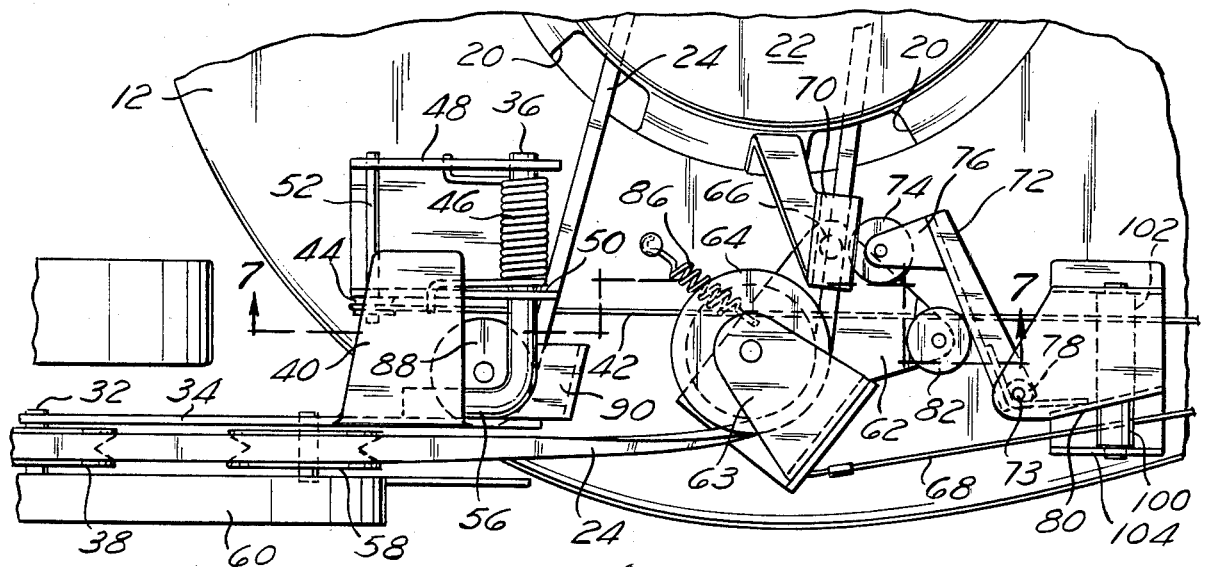
FIG. 4 is an enlarged, partial plan view of mechanisms in an inoperative position of the edger.
Figure 5:
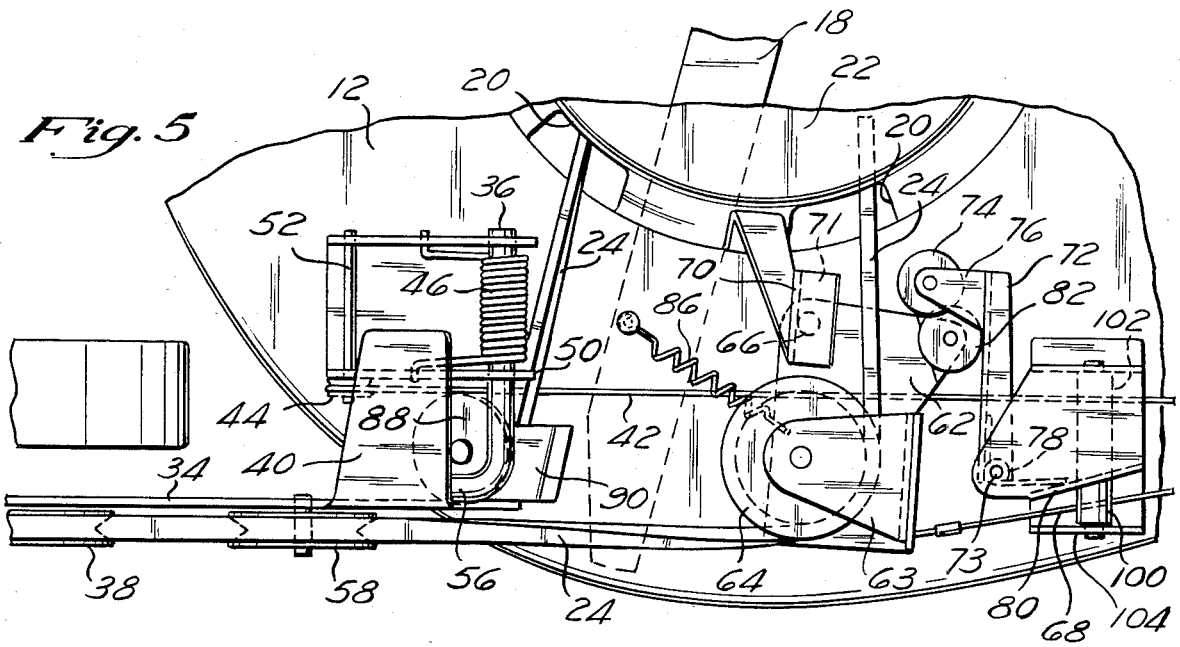
FIG. 5 is an enlarged partial plan view of mechanisms in an operative position of the edger.
Figure 6:
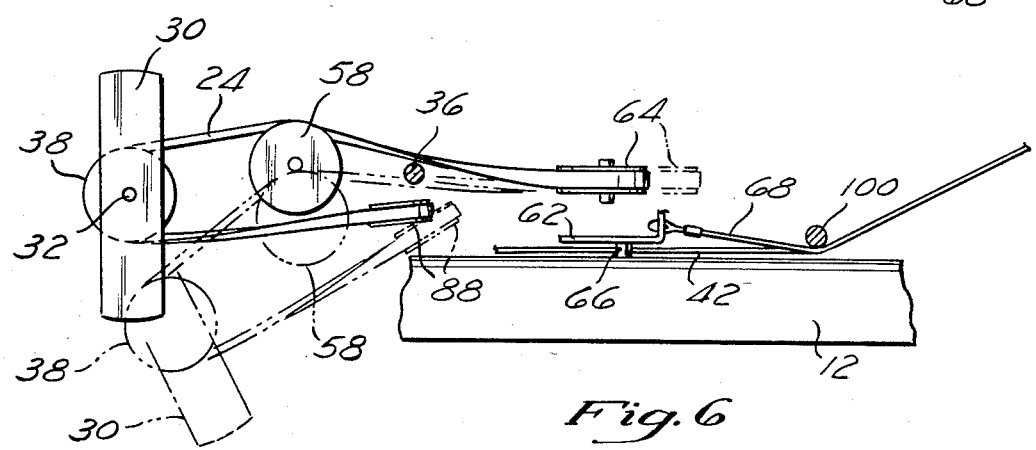
FIG. 6 is a partial side view showing the edger in inoperative position in full lines and in operative position in dashed lines.

The combination mower and edger 10 has a body 12 on which is mounted a motor 14 having a depending vertical shaft 16 on which a rotary grass-cutting blade 18 is mounted.

My edger mechanism is integrated with conventional lawnmower structure in original manufacture, as opposed to the proposal by some prior designers of providing an edger mechanism to be added as a separately manufactured attachment to one or more brands of previously manufactured rotary mowers. However, my changes to conventional mower manufacture are relatively minor, and include openings 20 in mower housing 22 for inbound and outbound travel of belt 24 and a pulley 26 on shaft 16 to provide power to belt 24. Pulley 26 would not have to be provided on the same shaft 16 on which rotary grass-cutting blade 18 is mounted, as pulley 26 could be otherwise powered by motor 14, but mounting pulley 26 on the same shaft 16 is a choice satisfactory in operation and low in cost.

Provision for original installation and replacement of belt 24 is simplified if a belt is used (as illustrated) that is fabricated from a number of segments 28 which can be added and deleted. This type of segmented belt is sold for use in belt replacements, having both the characteristics of adjustable length and installation without the apparatus disassembly sometimes called for in endless unitary belt replacements because of access problems. Another type of segmented belt or the like could be used or the assembly could be designed for an endless unitary belt.

An edger blade 30 is rotatably mounted by a horizontal shaft 32 that is supported by an arm 34 which is pivotally supported on housing 12 by a rod 36 to pivot about a horizontal axis, so that edger blade 30 is pivotal between an upper inoperative position and a lower operative position. Also mounted on shaft 32 is a pulley 38 driven by belt 24. Arm 34 has a flange 40 to which is connected a flexible cable 42. Cable 42 extends under a small pulley 44. Referring especially to FIG. 7, it will be understood that as a pulling force is applied to cable 42, flange 40 and arm 34 will pivot downwardly to move edger blade 30 to operative position.

A spring 46 coiled about rod 36 tends to upwardly pivot flange 40 and arm 34 to move edger blade 30 to inoperative position. Rod 36 is supported on housing 12 by flanges 48, 50. Flanges 48, 50 also support a rod 52 on which small pulley 44 is mounted. One end of spring 46 is retained by an opening 54 in flange 48. Arm 34 can be attached to rod 36 be welding to a leg 56 of arm 34 (which is L-shaped). Arm 34 also supports an intermediate idler pulley 58. A guard 60 is provided for edger blade 30.

The plane of the grass cutting blade 18 intersects the plane of edger blade 30 to provide a neat trimmed grass edge in operation.

A pivotal member 62 has flanges 63 rotatably supporting a belt-tightening idler pulley 64 engaged with belt 24. Member 62 is mounted on body 12 to pivot about a pin 66. A flexible cable 68 is attached to pivotal member 62 and idler pulley 64 is pulled to a belt tightening position as cable 68 is pulled.

A brake 70 is supported on housing 22. Brake 70 has a recess 71 of vee cross-section so that brake 70 will restrain belt 24 when the belt is forced into the vee cross-sectioned recess 71. A braking lever 72 is mounted on body 12 to pivot about a pin 73. A braking roller 74 mounted between flanges 76 on the end of lever 72. As lever 72 is pivoted toward brake 70, roller 74 forces belt 24 into the vee cross-sectioned recess 71 of brake 70 to brake belt 24. As lever 72 pivots away from brake 70, belt 24 is released from the vee shaped cross-sectioned recess 71 of brake 70 and is no longer restrained by brake 70.

A spring 78 is coiled about pin 73 and has one end bearing on braking lever 72 and the other end bearing on a flange 80 secured to body 12. Spring 78 normally biases lever 72 into braking position in which roller 74 presses belt 24 into the vee shaped recess 71. Pivotal member 62 has a camming roller 82 rotatably mounted on a flange 84. When pivotal member 62 is pulled by cable 68 to bring idler pulley 64 into belt-tightening position, camming roller 82 acts against braking lever 72 to cam lever 72 and roller 82 away from braking recess 71 (against the action of spring 78) thereby releasing belt 24 from the restraint of brake 70, whereby belt 24 will be powered by pulley 26 to rotate edger blade 30.

A tension spring 86 biases pivotal member 62 toward braking, belt loosening position. A pulley 88 supported between flanges 90 helps guide the lower run of belt 24. As belt 24 changes direction at pulley 88 and at idler pulley 64, preferably there pulleys have the type of annular groove 92 depicted particularly in FIG. 8, which accommodates such belt change in direction. Cables 42 and 68 join to a single cable 94, as shown in FIGS. 1 and 2. A spring 96 in the cable assembly accommodates different lengths of travels of cables 42, 68 in the operations above described. Cables 42, 68 are guided by rod-shaped members 100, 102 and by flanges 80, 104. Pulling of cables 42, 68 is accomplished by a pulling force applied to cable 94.

The pulling force on flexible cable 94 is obtained from an operating lever 110 pivoted about a pin 112 extending between parallel plates 114 attached to a U-shaped tubular handle 116. Cable 94 extends about a pulley 118 so that the upper end of lever 110 is moved forwardly to achieve a pulling force on cable 94. Such pulling force on cable 94 results in a lowering of edger blade 30 to operating position and results in powering of blade 30 by belt 24 due to belt tightening by idler pulley 64 and release of brake 70.

A guide 120 for lever 110 has a slot 122 with recesses 124 engaging with a lug 126 on lever 110. Lug 126 and recesses 124 are not meant to hold lever 110 in operating position by themselves but are meant to assist manual holding of lever 110 in operating position.

The operation of the edging mechanism has been described above in the process of describing the various mechanisms involved. It will be understood that an effective and economical apparatus bas been devised to meet the invention objectives.

It is common to have a deadman control yoke 130 having legs 132 pivotally connected to handle 110. Yoke 130 is normally spring pressed to the position shown in FIG. 1 and shown in dashed lines in FIGS. 10 and 11 and yoke 130 has to be held in the operating position shown in full lines in FIGS. 11 and 12. The intention is to deactivate the rotary mower blade 18 unless the operator is pressing yoke 130 toward the end of handle 116. In one form of deadman control, yoke 130 does not permit operation of motor 14 unless it is held in operating position. This may be accomplished by a connection (not shown) to the motor to open the ignition circuit when the deadman is released. Another type of deadman is indicated in FIGS. 10 and 11 in which a flexible cable 136 connects between yoke 130 and a brake 140 on rotary blade 18, which means blade 18 is braked when yoke 130 has the position to the left in FIGS. 10 and 11 and blade 18 is not braked when yoke 130 has the position to the right in FIGS. 10 and 11. Brake 140, cable 136 and the connection to yoke 130 are indicated schematically in FIG. 11. The intention in the deadman operation shown in FIGS. 10 and 11 is to permit operation of the edger only when rotary blade 18 is braked. This is accomplished by forming a reverse bend at the end 142 of one leg 132 of yoke 130, so that end 142 blocks advancement of lever 110 to edger operating position until deadman yoke 130 is released thereby braking blade 18.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. In the combination of a lawnmower and edger, the lawnmower having a rotary grass-cutting blade supported by a vertical shaft and the edger having a rotary edging blade supported by a horizontal shaft, a motor powering said shafts, a lawnmower body supporting said shafts, and a guiding handle attached to and rising from said body, the improvement, comprising:

(a) a lever pivotally mounted on an upper portion of said guiding handle and a flexible tension member having its upper end connected to said lever, the lower end of said flexible tension member having edger lowering means and braking and belt tightening means, an arm supporting said horizontal shaft and pivotally movable between a first inoperative upper edger position and a second operative lower edger position and spring means normally biasing said arm to its first inoperative upper edger position and said flexible tension member pulling said arm to said second operative lower edger position as said lever is operated, and (b) a pulley on said horizontal shaft and a pulley on said vertical shaft and belt means connecting said pulleys and an idler belt tightening pulley engaging said belt means and a brake engageable with said belt means and said braking and belt tightening means being connected to said idler pulley and to said brake and spring means normally biasing said brake to operative position thereof and normally biasing said idler pulley to belt loosening position and said flexible tension member pulling said brake to inoperative position thereof and pulling said idler pulley to belt tightening position thereof as said lever is operated.

2. The subject matter of claim 1 in which said brake includes a belt receiving member of vee cross-section positioned adjacent to said belt and a coacting member on the opposite side of said belt from said belt receiving member and spring means normally pressing said belt receiving member and said coacting member together to brake said belt, said flexible tension member separating said belt receiving member and said coacting member as said lever is operated.

3. The subject matter of claim 2 in which said edger lowering means and said braking and belt tightening means are formed by a bifurcation of the lower end of said flexible tension member into first and second flexible tension member sections and said first flexible tension member section being connected to said arm and a mounting member pivotally supported by said body and said second flexible tension member section being connected to said mounting member and said idler belt tightening pulley being supported by said mounting member and said spring means normally biasing said idler pulley to belt loosening position including a spring acting to bias said mounting member to a first belt loosening position and said flexible tension member pulling said idler pulley to belt tightening position thereof by pulley said mounting member to a second belt tightening position.

4. The subject matter of claim 3 in which said belt receiving member is fixedly supported by said body, a braking lever pivotally supported by said body and said coacting member being a braking roller mounted on an end of said braking lever and said spring means normally biasing said brake to operative position including a spring acting on said braking lever to normally bias said braking lever to force said braking roller against said belt receiving member to brake said belt therebetween, a camming roller supported by said mounting member and positioned to bear on said braking lever and said flexible member pulling said brake to inoperative position by pulling said mounting member to said second belt tightening position whereby said camming roller cams said braking lever to move said braking roller away from said belt receiving member at the same time said idler pulley is pulled to belt tightening position.

5. In the combination of a lawnmower and an edger, the lawnmower having a rotary grass-cutting blade supported to rotate about a vertical axis and the edger having a rotary edging blade supported by a horizontal shaft, a motor powering said blades, and a lawnmower body and a guiding handle attached to and rising from said body, the improvement, comprising:
  (a) a movable edger control member mounted on an upper portion of said guiding handle and a control link having its upper end connected to said control member, the lower end of said control link having edger lowering means and braking and belt tightening means,
  (b) an arm mounted on said body and supporting said horizontal shaft and pivotally movable between a first inoperative upper edger position and a second operative lower edger position and said first edger lowering means of said control link moving said arm between one and the other of said edger positions as said control member is moved, and
  (c) a pulley on said horizontal shaft and a motor powered pulley in said body supported to rotate about a vertical axis and belt means connecting said pulleys and an idler belt tightening pulley engaging said belt means and a brake engageable with said belt means and said braking and belt tightening means of said control link being connected to said idler pulley and to said brake, and said link as said control member is moved changing between operative and inoperative positions of said brake and between belt loosening and belt tightening positions of said idler pulley.

6. The subject matter of claim 5 in which said control member is a lever pivotally mounted on said guiding handle and said link is a flexible tension member and spring means normally biasing said arm to its first inoperative upper edger position and said flexible tension member pulling said arm to said second operative lower edger position as said lever is operated.

7. The subject matter of claim 5 in which said control member is a lever pivotally mounted on said guiding handle and said link is a flexible tension member and spring means normally biasing said brake to said operative position thereof and normally biasing said idler pulley to said belt loosening position and said flexible tension member pulling said brake to said inoperative position thereof and pulling said idler pulley to said belt tightening position thereof as said lever is operated.

8. The subject matter of claim 5 in which said brake includes a belt receiving member of vee cross-section positioned adjacent to said belt and a coacting member on the opposite side of said belt from said belt receiving member and spring means normally pressing said belt receiving member and said coacting member together to brake said belt, said control link separating said belt receiving member and said coacting member as said lever is operated.

9. The subject matter of claim 8 in which there is a mounting member pivotally supported by said body and said braking and belt tightening means being connected to said mounting member and said idler belt tightening pulley being supported by said mounting member and a spring normally biasing said mounting member to a first belt loosening position and said control link moving said idler pulley to belt tightening position thereof by moving said mounting member to a second belt tightening position.

10. The subject matter of claim 9 in which said belt receiving member is fixedly supported by said body, a braking lever pivotally supported by said body and said coacting member being a braking roller mounted on an end of said braking lever and a spring acting on said braking lever to normally bias said braking lever to force said braking roller against said belt receiving member to brake said belt therebetween, a camming roller supported by said mounting member and positioned to bear on said braking lever and when said link moves said mounting member to said second belt tightening position said camming roller cams said braking lever to move said braking roller away from said belt receiving member.

11. The subject matter of claim 10 in which said control link is a flexible tension member bifurcated at its lower end into a first section forming said edger lowering means and a second section forming said braking and belt tightening means.

12. The subject matter of claim 5 in which said control link is a flexible tension member bifurcated at its lower end into a first section forming said edger lowering means and a second section forming said braking and belt tightening means, and said control member being a control lever pivotally mounted on said handle and a toothed guide at the side of said control lever to help hold said control lever in operative position resulting in said inoperative position of said brake and resulting in said belt tightening position of said idler pulley and resulting in said second operative lower edger position of said arm.

13. The subject matter of claim 5 in which said control member is a control lever pivotally mounted on said handle, a U-shaped deadman control yoke with the legs of the U-shape pivotally connected to opposite sides of said handle and a rotary grass-cutting blade brake connected to said yoke operative to brake said rotary grass-cutting blade when said yoke is released and said yoke having at one end a stop pressing against said control lever holding said control lever against operation until said yoke is released whereby said edger can only be moved to said second lower edger position by said control lever when said rotary grass-cutting blade is braked.

14. The subject matter of claim 1 wherein said stop is formed by an end of said yoke which is bent into a reverse bend at the pivotal connection with said handle.

* * * * *